J. B. DE COSTA.
VACUUM CLEANER.
APPLICATION FILED JULY 2, 1914.

1,141,321.

Patented June 1, 1915.
2 SHEETS—SHEET 1.

WITNESSES:
R. Hamilton
L. J. Fischer

INVENTOR:
John B. DeCosta.
BY
F. G. Fischer,
ATTORNEY.

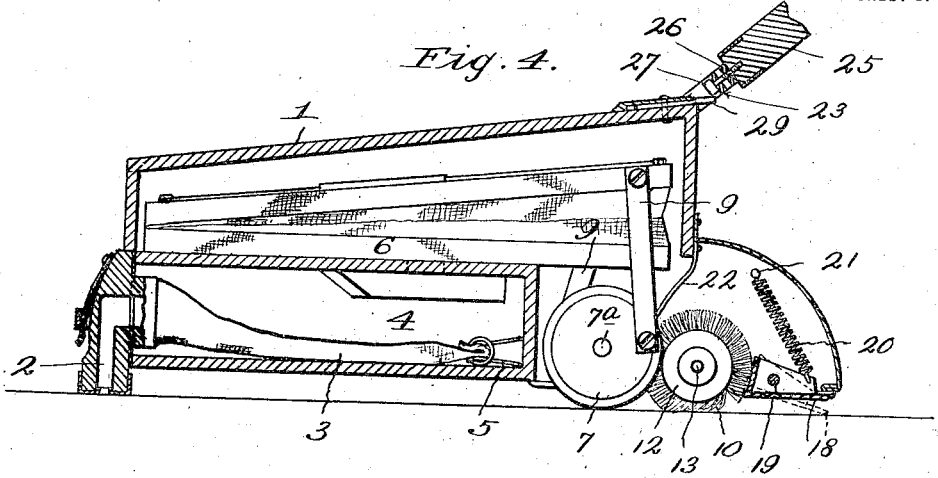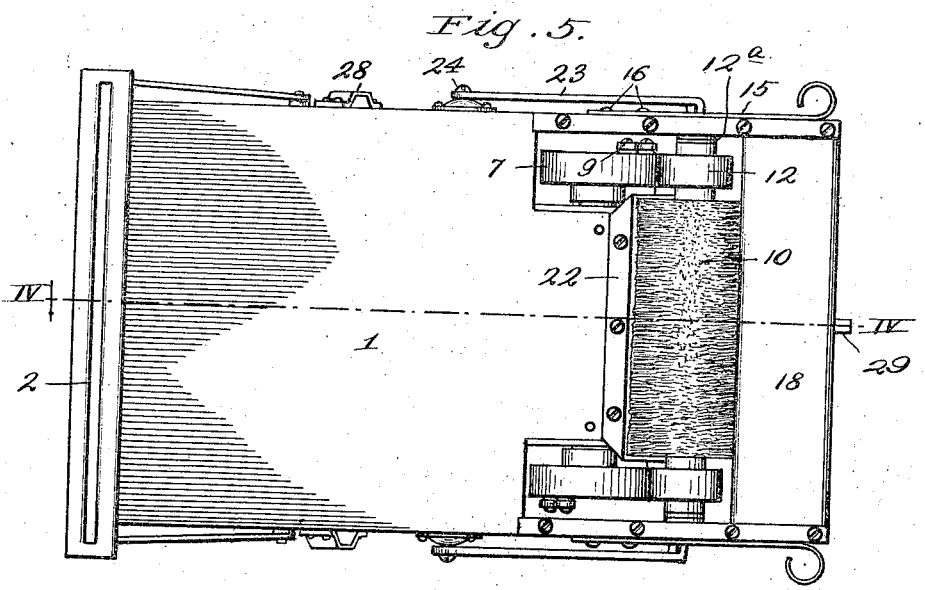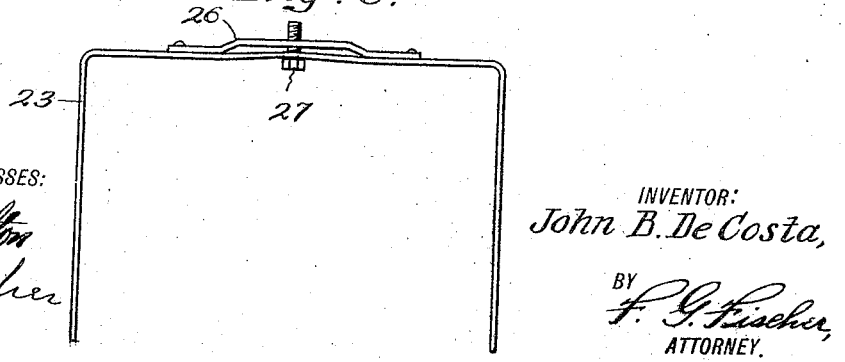

UNITED STATES PATENT OFFICE.

JOHN B. DE COSTA, OF KANSAS CITY, MISSOURI.

VACUUM-CLEANER.

1,141,321.  Specification of Letters Patent.  Patented June 1, 1915.

Application filed July 2, 1914. Serial No. 848,573.

*To all whom it may concern:*

Be it known that I, JOHN B. DE COSTA, a citizen of the United States, residing at Kansas City, in the county of Jackson and State of Missouri, have invented certain new and useful Improvements in Vacuum-Cleaners, of which the following is a specification.

My invention relates to improvements in vacuum cleaners, and the invention consists in certain novel features of construction, combination and arrangement of parts hereinafter described, and particularly pointed out in the claim.

Figure 1:
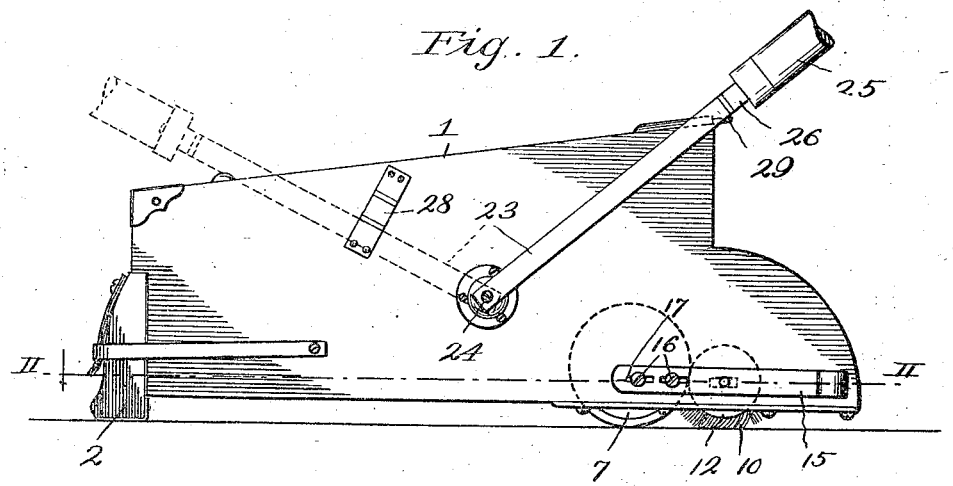
Figure 2:
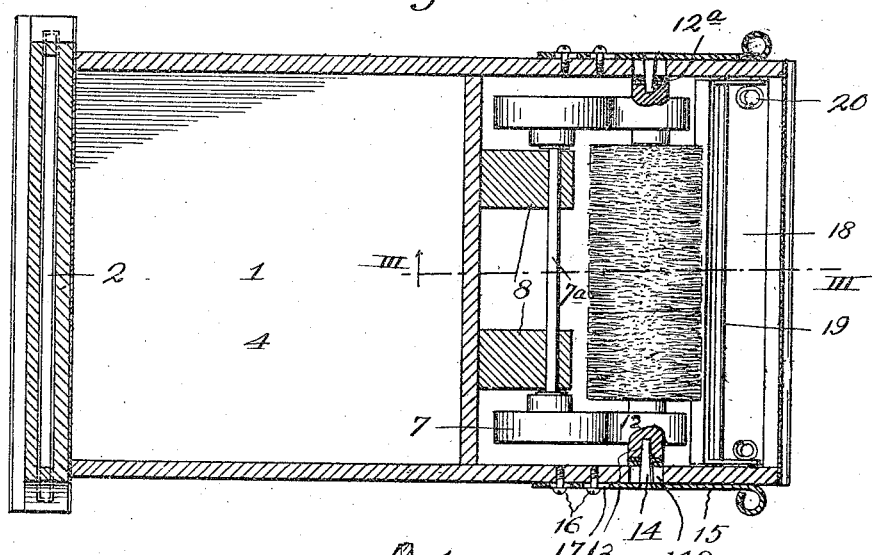
Figure 3:
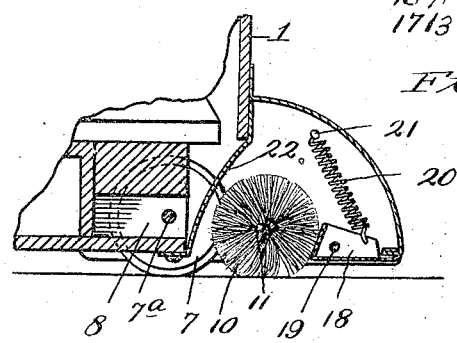

In order that the invention may be fully understood, reference will now be made to the accompanying drawings, in which:

Figure 1 is a side elevation of a vacuum cleaner embodying my invention. Fig. 2 is a horizontal longitudinal section on line II—II of Fig. 1. Fig. 3 is a broken detail section on line III—III of Fig. 2. Fig. 4 is a vertical longitudinal section on line IV—IV of Fig. 5. Fig. 5 is an inverted plan view of the cleaner. Fig. 6 is an elevation of a bail forming part of the invention.

In carrying out the invention, I employ a case 1, having a removable suction nozzle 2, extending across its lower front portion. Said suction nozzle 2 communicates with a dust-bag 3 arranged in a chamber 4. The rear end of the dust-bag 3 is folded and held in closed position by a clamp 5.

6 designates a bellows communicating with the chamber 4, for creating a suction through the nozzle 2. The foregoing is of ordinary construction, hence further description thereof is deemed unnecessary.

7 designates a pair of rubber tired traction wheels mounted upon an axle 7ª, journaled in a pair of bearings 8. Said traction wheels 7 actuate the bellows 6 through the intermediacy of a pair of connecting-rods 9.

10 designates a rotary broom, or sweeper, fixedly-mounted upon a twisted wire shaft 11, carrying at its ends a pair of friction wheels 12, which engage the peripheries of the traction wheels 7, which drive said friction wheels 12. The friction wheels 12 have axial counterbores 13 to receive a pair of trunnions 14 upon which said friction wheels are journaled.

Trunnions 14 are mounted upon flat springs 15, secured to the sides of the case 1 by screws 16. By mounting the trunnions 14 upon the springs 15, said trunnions may be drawn longitudinally from the counterbores 13 should it become necessary to repair or renew the friction wheels 12, or the sweeper 10.

The springs 15 have slots 17 for the passage of the screws 16, so that said springs may be adjusted longitudinally to keep the friction wheels 12 in engagement with the traction wheels 6, as the peripheries thereof wear away. The sides of the case 1 have slots 14ª, to permit the longitudinal movement of the springs 15.

Spring washers 12ª are interposed between the hubs of the friction wheels 12 and the adjacent sides of the case, as disclosed by Figs. 2 and 5.

18 designates a dust pan pivotally-mounted in the rear of the sweeper 10, to receive the sweepings gathered from a floor by said sweeper. Said dust pan 18 is pivotally-mounted upon a rod 19, secured to opposite sides of the case 1. By thus pivotally-mounting the dust pan 18 it may be swung to open position, as indicated by dotted lines, Fig. 4, for the purpose of emptying its contents therefrom. The dust pan 18 is normally held in closed position by a pair of coil springs 20, secured at their lower ends to said dust pan and at their upper ends to pins 21 extending inwardly from the adjacent sides of the case 1.

22 designates a deflector extending partway over the front side of the sweeper 10, to deflect the sweepings carried up thereby into the dust pan 18.

23 designates a bail pivotally-secured by pins or screws 24, to opposite sides of the case 1 to receive a handle 25, whereby the sweeper is pushed to and fro over a floor. Said bail has a reinforcing strip 26 at its upper transverse portion, through which a screw 27 extends to secure the handle 25 to said strip 26. The handle 25 may be unscrewed from the screw 27 when the sweeper is to be shipped or stored.

28 designates a pair of resilient bail retainers secured at opposite sides of the case 1, to hold the bail in the forward position disclosed by dotted lines, Fig. 1, so that the sweeper may be carried with its rear end downward to prevent spilling the contents of the dust pan 18.

29 designates a trip pivoted at the upper rear corner of the case 1, for the head of the screw 27 to abut when the handle 25 is pushed backward and downward for the purpose of tipping the forward end of the sweeper to raise the suction nozzle above obstructions on the floor. The trip 29 may be swung out of the path of the screw 27, to allow unrestricted pivotal movement of the handle 25, when desired.

From the foregoing description, it is apparent that I have produced a sweeper of comparatively simple and inexpensive construction, and embracing a number of new and novel features which coöperate in adding to the efficiency and convenience of handling said sweeper.

Having thus described my invention, what I claim and desire to secure by Letters Patent, is:

In a machine of the character described, a case, a bail pivotally mounted upon said case, a transverse reinforcing member on said bail, a headed screw extending through the bail and said reinforcing member, a handle removably-engaged by said screw, and a trip pivoted to the case and adapted to be engaged by the head of said screw.

In testimony whereof I affix my signature, in the presence of two witnesses.

JOHN B. DE COSTA.

Witnesses:
R. E. HAMILTON,
F. G. FISCHER.